US012548729B2

(12) United States Patent
Torai

(10) Patent No.: US 12,548,729 B2
(45) Date of Patent: Feb. 10, 2026

(54) MAGNETRON

(71) Applicant: Hitachi Power Solutions Co., Ltd., Ibaraki (JP)

(72) Inventor: Reiji Torai, Ibaraki (JP)

(73) Assignee: HITACHI POWER SOLUTIONS CO., LTD., Ibaraki (JP)

( * ) Notice: Subject to any disclaimer, the term of this patent is extended or adjusted under 35 U.S.C. 154(b) by 58 days.

(21) Appl. No.: 18/777,641

(22) Filed: Jul. 19, 2024

(65) Prior Publication Data

US 2025/0037957 A1 Jan. 30, 2025

(30) Foreign Application Priority Data

Jul. 28, 2023 (JP) ................................ 2023-123886

(51) Int. Cl.
*H01J 23/02* (2006.01)
*H01J 25/50* (2006.01)

(52) U.S. Cl.
CPC .............. *H01J 23/02* (2013.01); *H01J 25/50* (2013.01)

(58) Field of Classification Search
CPC .......... H01J 25/587; H01J 23/10; H01J 23/20; H01J 25/50; H01J 23/00; H01J 25/60; H01J 23/02; H01J 23/15; H01J 23/05; H01J 23/027; H01J 23/14; H01J 23/22; H01J 2225/50; H01J 23/04; H01J 23/12; H01J 2237/026; H01J 23/11; H01J 23/54
See application file for complete search history.

(56) References Cited

U.S. PATENT DOCUMENTS

2007/0139125 A1* 6/2007 Baek ...................... H01J 25/58 331/5

FOREIGN PATENT DOCUMENTS

JP 2012-169169 A 9/2012

* cited by examiner

*Primary Examiner* — Lincoln D Donovan
*Assistant Examiner* — Tyler J Pereny
(74) *Attorney, Agent, or Firm* — MATTINGLY & MALUR, PC

(57) ABSTRACT

Provided is a magnetron capable of preventing damage to a coil and suppressing oscillation stop due to occurrence of abnormal oscillation. A magnetron is a high-output type industrial magnetron in which all plate-shaped vanes belonging to a first plate-shaped vane group and all plate-shaped vanes belonging to a second plate-shaped vane group have the same number (at least three or more) of through holes near tips in a direction of a central axis, and when n is a numerical value indicating an odd number starting with 1, an n-th pressure equalizing ring penetrates to come into contact with an n-th through hole of all the plate-shaped vanes belonging to the first plate-shaped vane group and an (n+1)-th pressure equalizing ring penetrates to come into contact with an (n+1)-th through hole of all the plate-shaped vanes belonging to the second plate-shaped vane group.

4 Claims, 11 Drawing Sheets n REPRESENTS ODD NUMBER STARTING WITH 1.

1 52g1
2 52g2

A-A

MAGNETRON

CROSS-REFERENCE TO RELATED APPLICATION

The present application claims priority from Japanese application JP2023-123886, filed on Jul. 28, 2023, the content of which is hereby incorporated by reference into this application.

TECHNICAL FIELD

The present invention relates to a magnetron.

BACKGROUND ART

The magnetron uses a strap ring in order to equalize the potential of the plate-shaped vane and to suppress the influence of unnecessary radiation that becomes noise.

PTL 1 discloses a magnetron including: an anode cylinder that extends along a central axis; a plurality of plate-shaped vanes that are joined to the anode cylinder and extend toward the central axis, and have a free end forming an inscribed circle surrounding the central axis; and a large-diameter strap ring and a small-diameter strap ring that are arranged to be joined to a notch portion provided on a side between the anode cylinder and the free end of the vane and alternately short-circuit the vane, the small-diameter strap ring having a diameter smaller than that of the large-diameter strap ring, in which an inner diameter of the large-diameter strap ring is equal to an outer diameter of the small-diameter strap ring, and the strap rings are arranged in the notch portion to have a step relative to each other in a central axis direction.

CITATION LIST

Patent Literature

PTL 1: JP 2012-169169 A

SUMMARY OF INVENTION

Technical Problem

In the technique disclosed in PTL 1, the inner diameter of the large-diameter strap ring is equal to the outer diameter of the small-diameter strap ring, and the large-diameter strap ring and the small-diameter strap ring are arranged with a step on the vane end surface so as not to contact each other. By making the inner diameter of the large-diameter strap ring equal to the outer diameter of the small-diameter strap ring, the amount of scrap can be reduced when pressing the strap ring from the plate, and thus the material efficiency of the strap ring can be improved and the manufacturing cost can be reduced.

However, in a high-output type industrial magnetron, a method for installing a strap ring (hereinafter, referred to as a pressure equalizing ring) in PTL 1 has two problems.

A first problem is that pressure equalizing rings have a structure in which a notch is provided on a side of a plate-shaped vane, and a large-diameter pressure equalizing ring and a small-diameter pressure equalizing ring, which has a diameter smaller than that of the large-diameter pressure equalizing ring, are joined and arranged to alternately short-circuit the plate-shaped vanes, but in this structure, the microwave of a fundamental wave is transmitted through a vacuum pipe to a coil side, so that the coil may be burned.

The second problem is that the influence of unnecessary radiation on the fundamental wave cannot be sufficiently suppressed, and abnormal oscillation may be caused.

The present invention has been made in view of the above problems, and an object of the present invention is to provide a magnetron capable of preventing damage to a coil and suppressing oscillation stop due to occurrence of abnormal oscillation.

Solution to Problem

In order to achieve the above object, a magnetron of the present invention is a high-output type industrial magnetron including: an anode cylindrical body; a plurality of plate-shaped vanes each of which has one end fixed to each of a plurality of different fixing portions on an inner wall surface of the anode cylindrical body and another end extending from the fixing portion toward a central axis of the magnetron; and a predetermined number of pressure equalizing rings arranged inside the anode cylindrical body. The plurality of plate-shaped vanes constitute a first plate-shaped vane group constituted by a set of the plate-shaped vanes in every arranged other line clockwise or counterclockwise with a plate-shaped vane at a predetermined position as a start position and a second plate-shaped vane group constituted by a set of the plate-shaped vanes excluding the first plate-shaped vane group, all the plate-shaped vanes belonging to the first plate-shaped vane group and all the plate-shaped vanes belonging to the second plate-shaped vane group have the same number (at least three or more) of through holes near tips in a direction of the central axis, the number being a number set, by performing a test operation in a production stage of the magnetron, to widen dissociation between a fundamental wave generated by resonance in a resonance cavity and unnecessary radiation, when n is a numerical value indicating an odd number starting with 1, the n-th pressure equalizing ring penetrates to come into contact with the n-th through holes of all the plate-shaped vanes belonging to the first plate-shaped vane group, and the (n+1)-th pressure equalizing ring penetrates to come into contact with the (n+1)-th through holes of all the plate-shaped vanes belonging to the second plate-shaped vane group. Other aspects of the present invention will be described in the following embodiment.

Advantageous Effects of Invention

According to the present invention, it is possible to prevent damage to a coil and to suppress oscillation stop due to occurrence of abnormal oscillation.

DESCRIPTION OF EMBODIMENTS

An embodiment for carrying out the present invention will be described in detail with reference to the drawings as appropriate.

Figure 1:
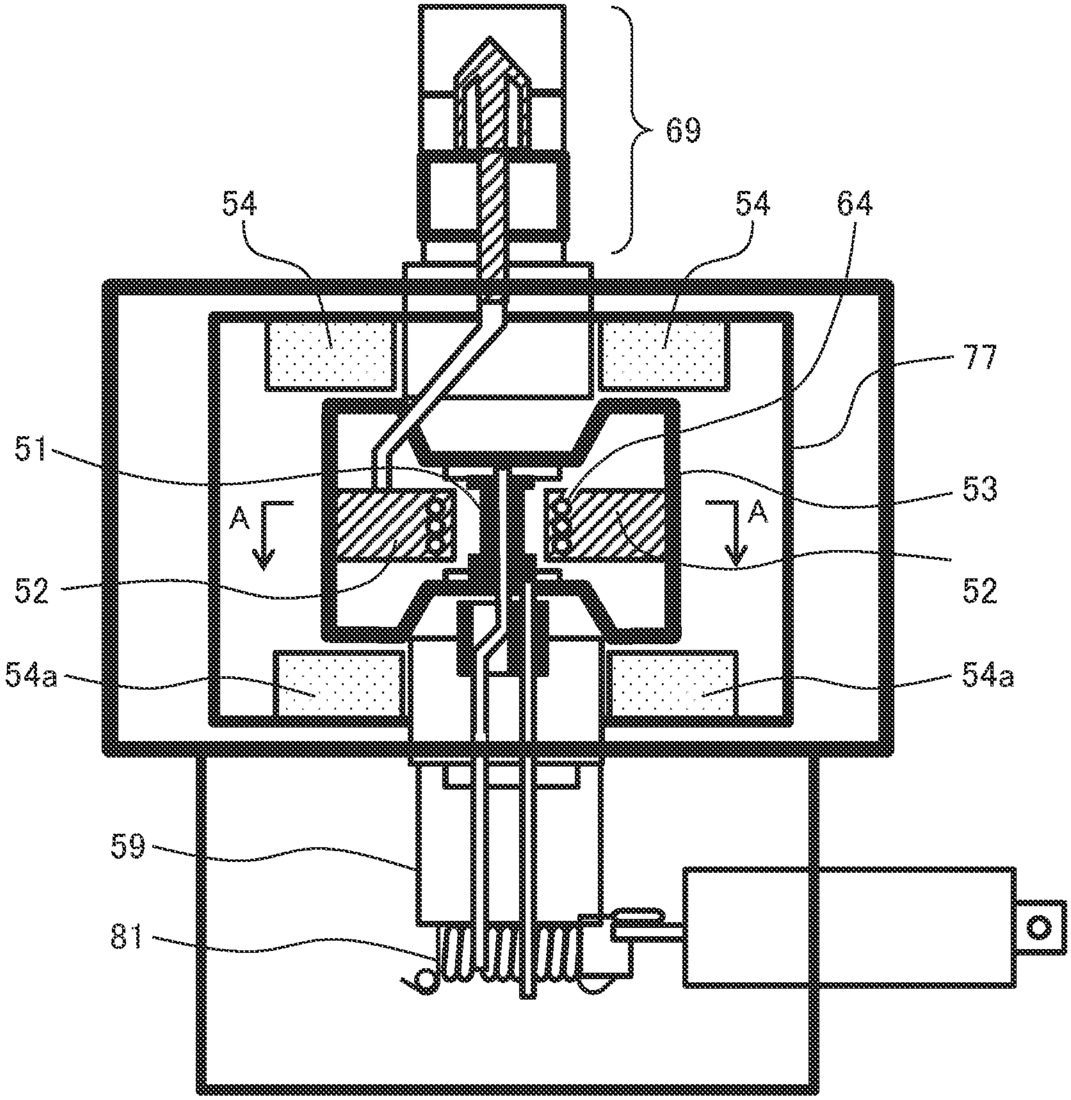
FIG. 1 is a view illustrating a structure of a high-output type industrial magnetron according to the present embodiment.

FIG. 1 is a view (cross-sectional view) illustrating a structure of a high-output type industrial magnetron 100 according to the present embodiment. The high-output type industrial magnetron 100 includes an anode cylindrical body 53, a plurality of plate-shaped vanes 52 each of which has one end fixed to each of a plurality of different fixing portions **52*f* (see FIG. 4) on an inner wall surface of the anode cylindrical body 53 and the other end extending from the fixing portion 52*f* toward a central axis, a cathode filament 51 disposed at the center of the anode cylindrical body 53, and permanent magnets 54 and 54*a*. A heater is wound around the cathode filament 51, and a predetermined current is applied thereto, so that thermal electrons are emitted from the cathode filament 51. The thermal electrons are attracted to the anode cylindrical body 53 side, but circulate while rotating around the cathode by the magnetic field formed by the magnet, and are caused to resonate in a resonance cavity (described later) which is a cavity formed by the inner wall surface of the anode cylindrical body 53 and the plurality of plate-shaped vanes 52, and the energy thereof is extracted as microwaves from an output portion 69 (antenna). As will be described later in detail with reference to FIGS. 2A to 5, a structure is made such that through holes 52*h* (for example, see FIG. 2A) are provided at the ends of the plurality of plate-shaped vanes 52 to allow the penetration of the pressure equalizing ring 64**.

Note that in general, an industrial magnetron with an output of about 2 to 10 kW is considered a low output type, and an industrial magnetron with an output greater than about 10 kW is considered a high output type. In addition, an industrial magnetron with an output of a magnetron level for home use and several kW may be considered a low output type, and an industrial magnetron with an output greater than several kW may be considered a high output type.

Figure 9:
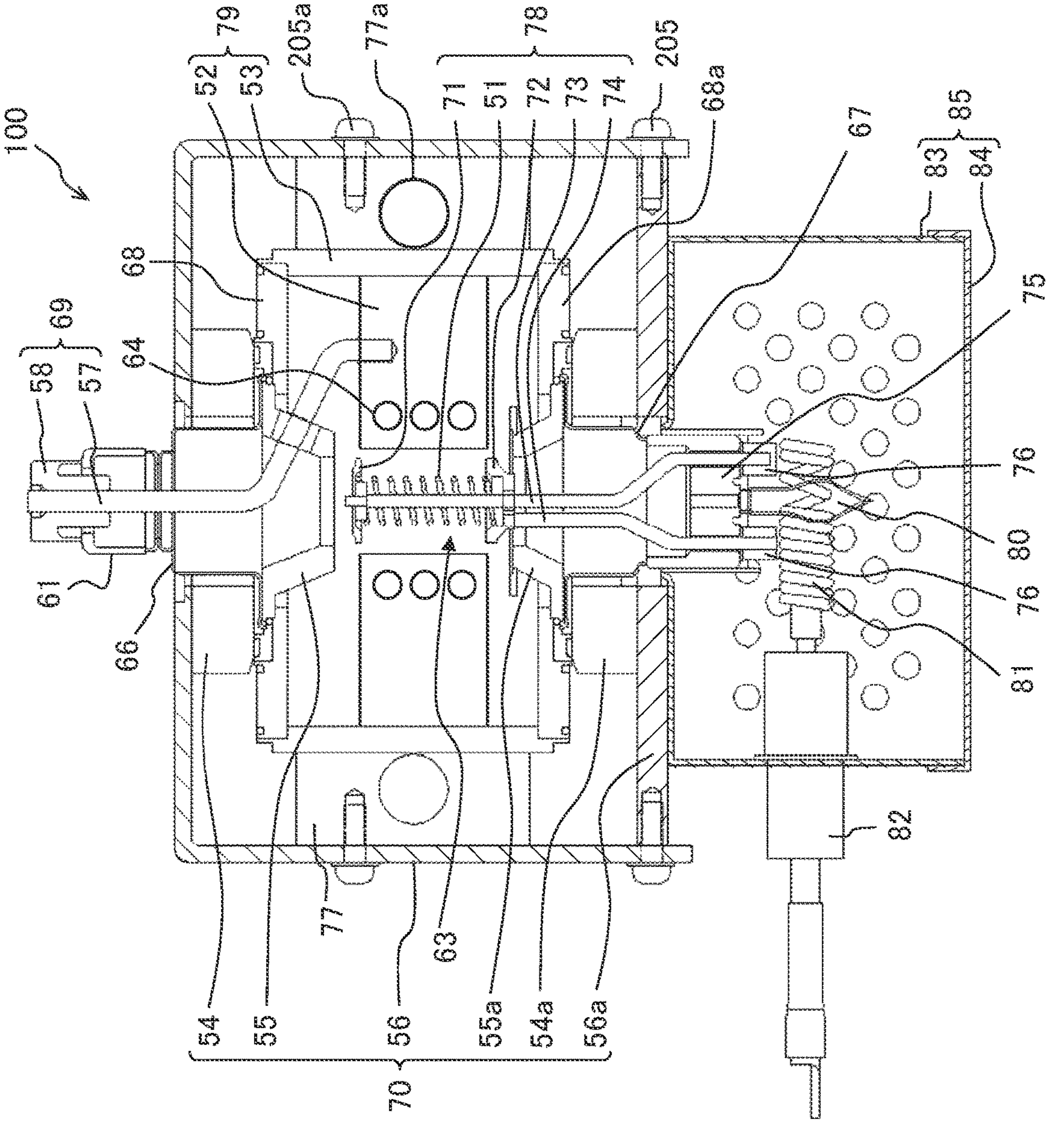
FIG. 9 is a view illustrating details of a structure of a high-output type industrial magnetron according to the present embodiment.

FIG. 9 is a view illustrating details of a structure of the high-output type industrial magnetron according to the present embodiment. In the magnetron 100, a reference sign 51 denotes a cathode filament (direct heat type spiral cathode) serving as a thermal electron emission source, a reference sign 52 denotes a plurality of plate-shaped vanes (anode vanes), and a reference sign 53 denotes an anode cylindrical body.

Reference signs 54 and **54*a* denote annular permanent magnets, reference signs 55 and 55*a* denote magnetic poles, and reference signs 56 and 56*a* denote yokes. A reference sign 57 denotes an antenna lead, a reference sign 58 denotes a cylindrical antenna block, a reference sign 61 denotes an output-side ceramic (insulator), a reference sign 63 denotes an active space, a reference sign 64 denotes a pressure equalizing ring, reference signs 66 and 67 denote rod-shaped upper and lower sealing metals, reference signs 68 and 68*a* denote upper and lower anode plates, and a reference sign 69 denotes an output portion. The output portion 69 includes an antenna lead 57 and an antenna block 58. In addition, the antenna lead 57 and the antenna block 58** are joined by a method such as silver brazing or arc welding.

A reference sign 70 denotes a magnetic circuit unit, and the magnetic circuit unit 70 includes the permanent magnets 54 and **54*a*, which are magnetic generation sources, the magnetic poles 55 and 55*a*, and the yokes 56 and 56*a*. A reference sign 71 denotes an upper end shield (also referred to as an output-side end shield), a reference sign 72 denotes a lower end shield (also referred to as an input-side end shield), a reference sign 73 denotes a center lead of a cathode lead, and a reference sign 74** denotes a side lead of the cathode lead.

A reference sign 75 denotes an input-side ceramic, and a reference sign 78 denotes a cathode portion. The cathode portion 78 includes the cathode filament 51 serving as a thermal electron emitting source, the upper end shield 71, the lower end shield 72, the cathode leads 73 and 74, and the like. A reference sign 79 denotes an anode portion, and the anode portion 79 is fixed to the plurality of plate-shaped vanes 52 and the anode cylindrical body 53 by brazing or the like, or integrally formed with the anode cylindrical body 53 by extrusion molding. A reference sign 76 denotes a terminal plate, and a reference sign 80 denotes an exhaust pipe.

In the magnetron 100 having such components, the yokes 56 and **56*a* constitute the magnetic circuit unit 70, but are also housings that house the permanent magnets 54 and 54*a*, the magnetic poles 55 and 55*a*, the antenna lead 57, the cathode portion 78, and the anode portion 79, are arranged on the output side of microwaves, and are also used as coupling members with an external mechanism (not illustrated). The housing is configured such that one yoke 56 has a box shape with a lower surface opened, and the other yoke 56*a* has a lid shape that closes the opening. In addition, the yoke 56 and yoke 56*a* are screwed to each other with a screw 205, and further the yoke 56 is screwed to a cooling mechanism 77 with a screw 205*a***.

The magnetic poles 55 and **55*a* made of a ferromagnetic material such as soft iron and the cylindrical permanent magnets 54 and 54*a* are arranged above and below the anode cylindrical body 53. The magnetic flux generated from the permanent magnets 54 and 54*a* passes through the magnetic poles 55 and 55*a* and enters the active space 63 formed between the cathode filament 51 and the plate-shaped vane 52, and applies a necessary DC magnetic field in the axial direction which is the vertical direction of the magnetron 100**.

The DC magnetic field exerts the following effects. That is, when magnetic flux is applied in the vertical direction (axial direction) to electrons flying in a horizontal direction from the cathode filament 51 toward the plate-shaped vane 52 in a state where the main body axis of the magnetron 100 is installed perpendicular to a horizontal plane, Lorentz force is applied to the electrons. The Lorentz force causes electrons to fly while spirally swirling in the horizontal direction, and a radio-frequency electric field is formed in the plate-shaped vane 52.

The cathode filament 51 emits electrons in an applied state of a DC negative high voltage of 4 kV to 8 kV, and the electrons form a radio-frequency electric field in each plate-shaped vane 52 while spirally moving under the action of the electric field and the magnetic field as described above. The formed radio-frequency electric field is output from the antenna block 58 to an external device (not illustrated) through the antenna lead 57.

In addition, in consideration of electron emission characteristics, processability, and the like, the cathode filament 51 generally uses a tungsten wire containing about 1% thorium oxide ($ThO_2$), and is supported by the upper end shield 71, the lower end shield 72, and the cathode leads 73 and 74. From the viewpoint of heat resistance and processability, the cathode leads 73 and 74 are generally made of molybdenum (Mo), and are connected to a choke coil 81 via the terminal plate 76 brazed to the upper surface of the input-side ceramic 75 with silver solder or the like.

A filter structure 85 including a filter case 83 that supports the choke coil 81 and a feedthrough capacitor 82 and a lid body 84 that closes the filter case 83 is attached to the lower portion of the magnetron 100. The choke coil 81 connected to the terminal plate 76 constitutes an L-C filter together with the feedthrough capacitor 82, and suppresses low-frequency components propagated from the cathode leads 73 and 74. However, radio-frequency component are shielded by the filter case 83 and the lid body 84 thereof. In addition, the cooling mechanism 77 installed on the outer periphery of the anode cylindrical body 53 is disposed such that a cooling water passage **77*a* through which cold water passes circulates therein, and diffuses the heat generated by the operation of the magnetron 100** with the cold water passing through the cooling mechanism.

In addition, the exhaust pipe 80 is used to remove gas inside a main body of a vacuum pipe 59 of the magnetron in which the cathode portion 78, the anode portion 79, and the output portion 69 are sealed. After the gas is released and a vacuum state is established, the tip of the exhaust pipe 80 is sealed.

The damage of the coil as the first problem and the suppression of the influence of unnecessary radiation on the fundamental wave as the second problem in the high-output type magnetron 100 described above are solved as follows.

First Problem

The first problem is solved as follows.

Figure 2A:
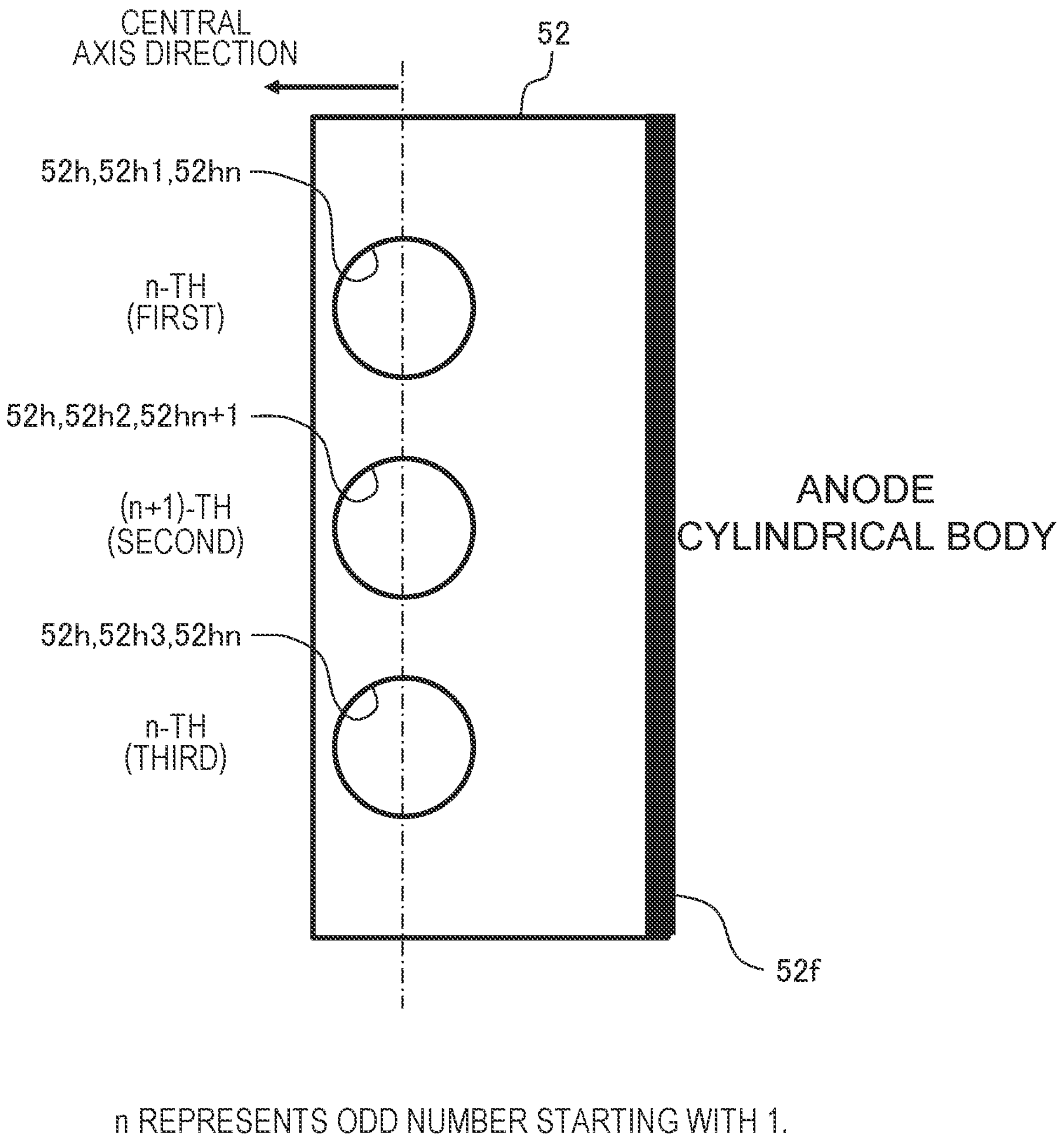
FIG. 2A is a view illustrating an arrangement in a case where there are three through holes of a plate-shaped vane.
Figure 2B:
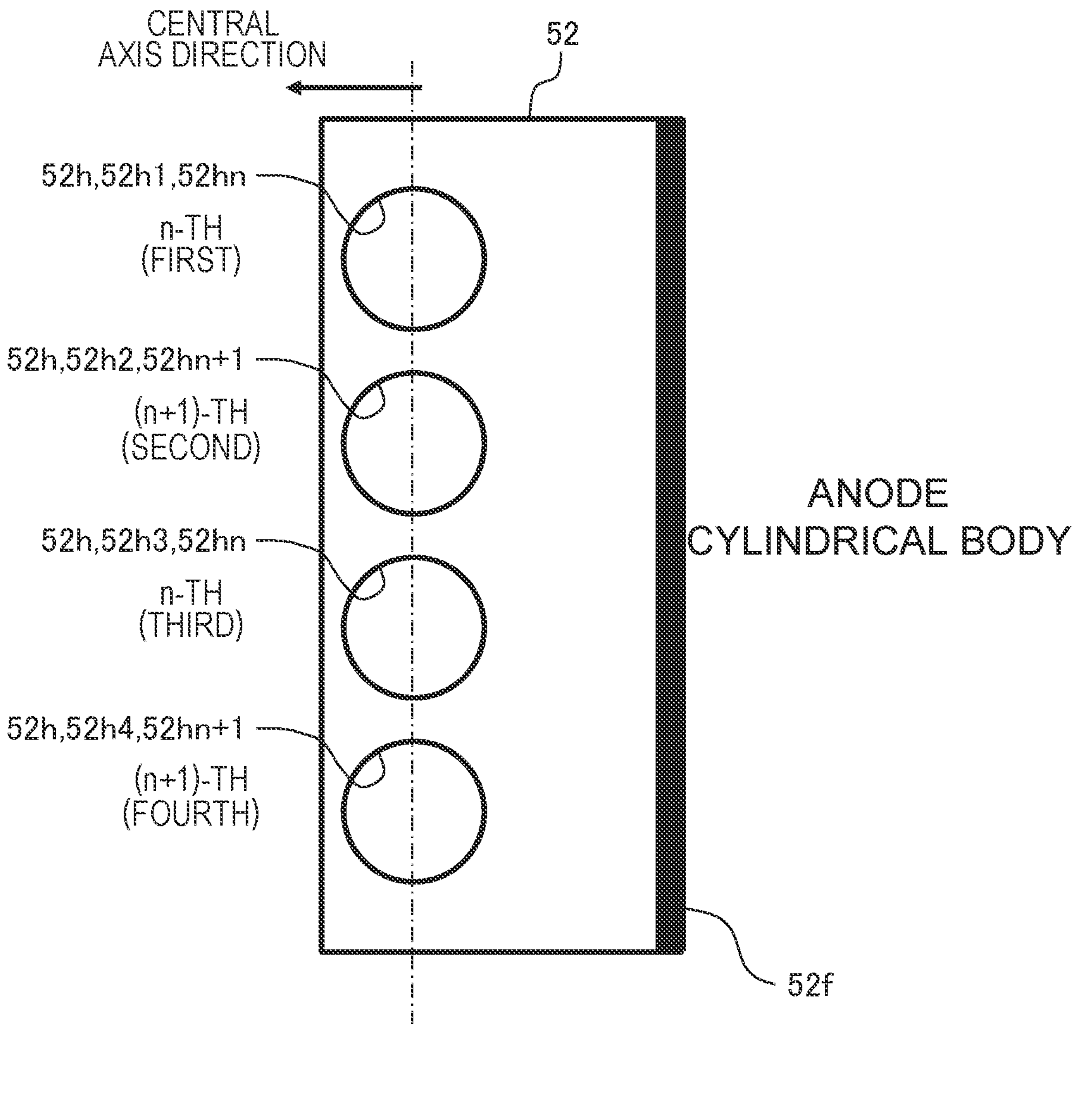
FIG. 2B is a view illustrating an arrangement in a case where there are four through holes of the plate-shaped vane.

FIG. 2A is a view illustrating an arrangement in a case where there are three through holes **52*h* of the plate-shaped vane 52. FIG. 2B is a view illustrating an arrangement in a case where there are four through holes 52*h* of the plate-shaped vane 52. FIGS. 2A and 2B illustrate a view in which the through hole 52*h* of the plate-shaped vane 52 is installed. In order to solve the problem of coil burnout due to the fundamental wave, the pressure equalizing ring is not provided with a notch on the side of the plate-shaped vane 52, but a structure is made such that a through hole is provided at the end of the plate-shaped vane 52 to allow the penetration of the pressure equalizing ring 64. This suppresses microwaves from flowing to the choke coil 81 side through the lower portion of the main body of the vacuum pipe 59. Note that the main body of the vacuum pipe 59 internally seals a part of the cathode portion 78, the anode portion 79, and the output portion 69**.

In the plate-shaped vanes 52, the same number of through holes **52*h* are vertically arranged in the vicinity of the ends in a central axis direction. Note that the hole diameter will be described later with reference to FIG. 5**.

In the present embodiment, in a case where a through hole **52*hn*** is used, n increases to 1, 3, 5, and so on as a numerical value indicating an odd number starting with 1. In addition, the (n+1)-th numerical value is a numerical value representing an even number such as 2, 4, and 6.

For example, in a case where there are three through holes illustrated in FIG. 2A, when n=1, a through hole **52*h*1 (first) and a through hole 52*h*2 (second) are provided, and when n=3, a through hole 52*h*3** (third) is provided.

In a case where there are four through holes illustrated in FIG. 2B, when n=1, the through hole **52*h*1 (first) and the through hole 52*h*2 (second) are provided, and when n=3, the through hole 52*h*3 (third) and the through hole 52*h*4** (fourth) are provided. Note that the arrangement of the through holes is not limited thereto.

Figure 3A:
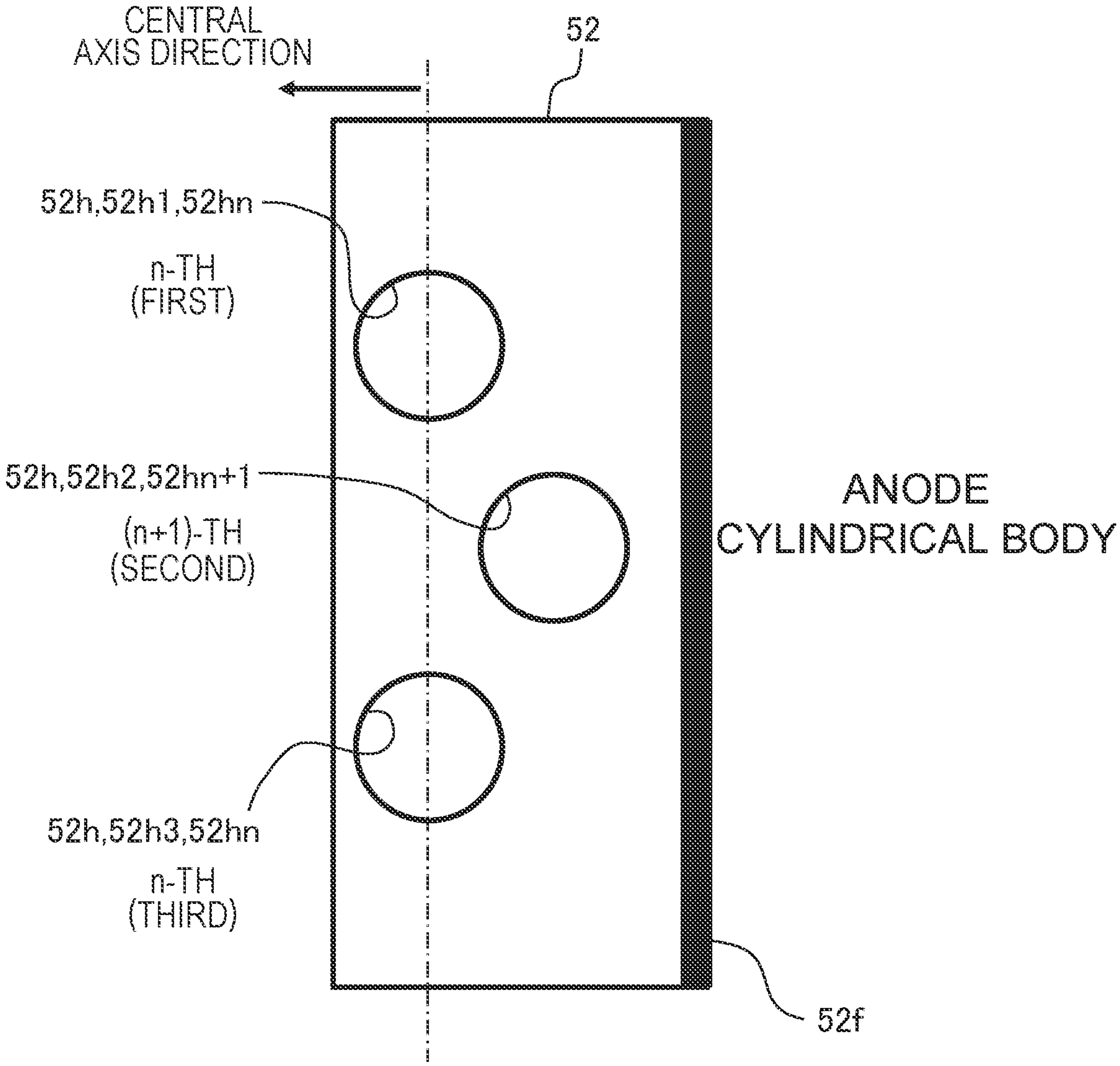
FIG. 3A is a view illustrating another arrangement in a case where there are three through holes of the plate-shaped vane.
Figure 3B:
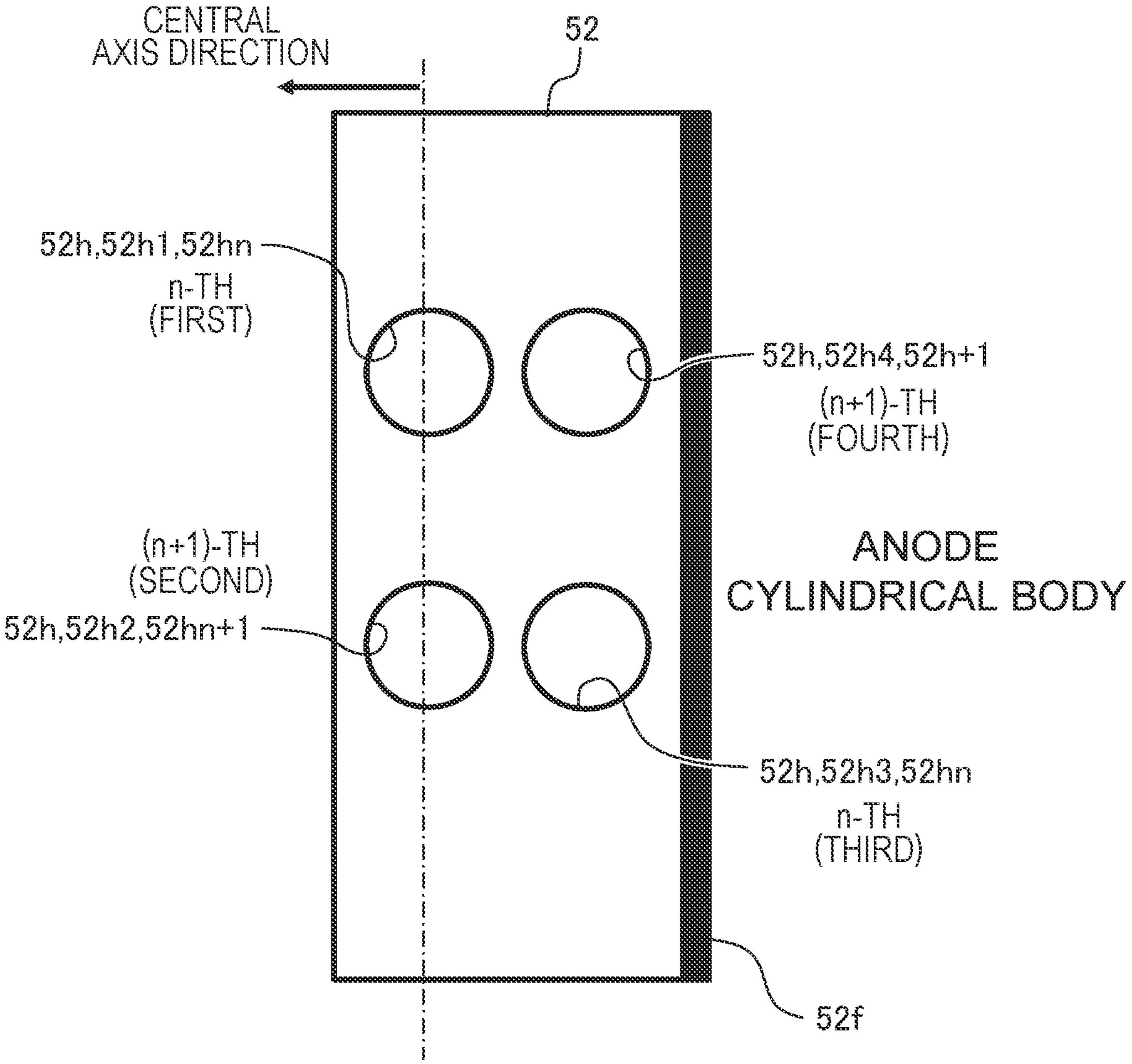
FIG. 3B is a view illustrating another arrangement in a case where there are four through holes of the plate-shaped vane.

FIG. 3A is a view illustrating another arrangement in a case where there are three through holes of the plate-shaped vane 52. FIG. 3B is a view illustrating another arrangement in a case where there are four through holes of the plate-shaped vane. As illustrated in FIGS. 3A and 3B, the center points of the through holes do not necessarily need to be arranged on the same vertical line, and may be arranged at positions shifted with respect to the central axis direction, or may be arranged in two rows with respect to a vertical line direction. However, in terms of processing, it is preferable to arrange the center points so as to be aligned in the vertical line direction. FIGS. 3A and 3B are effective when there is a limitation in the height direction of the plate-shaped vane 52 as compared with FIGS. 2 and 2B.

Figure 4:
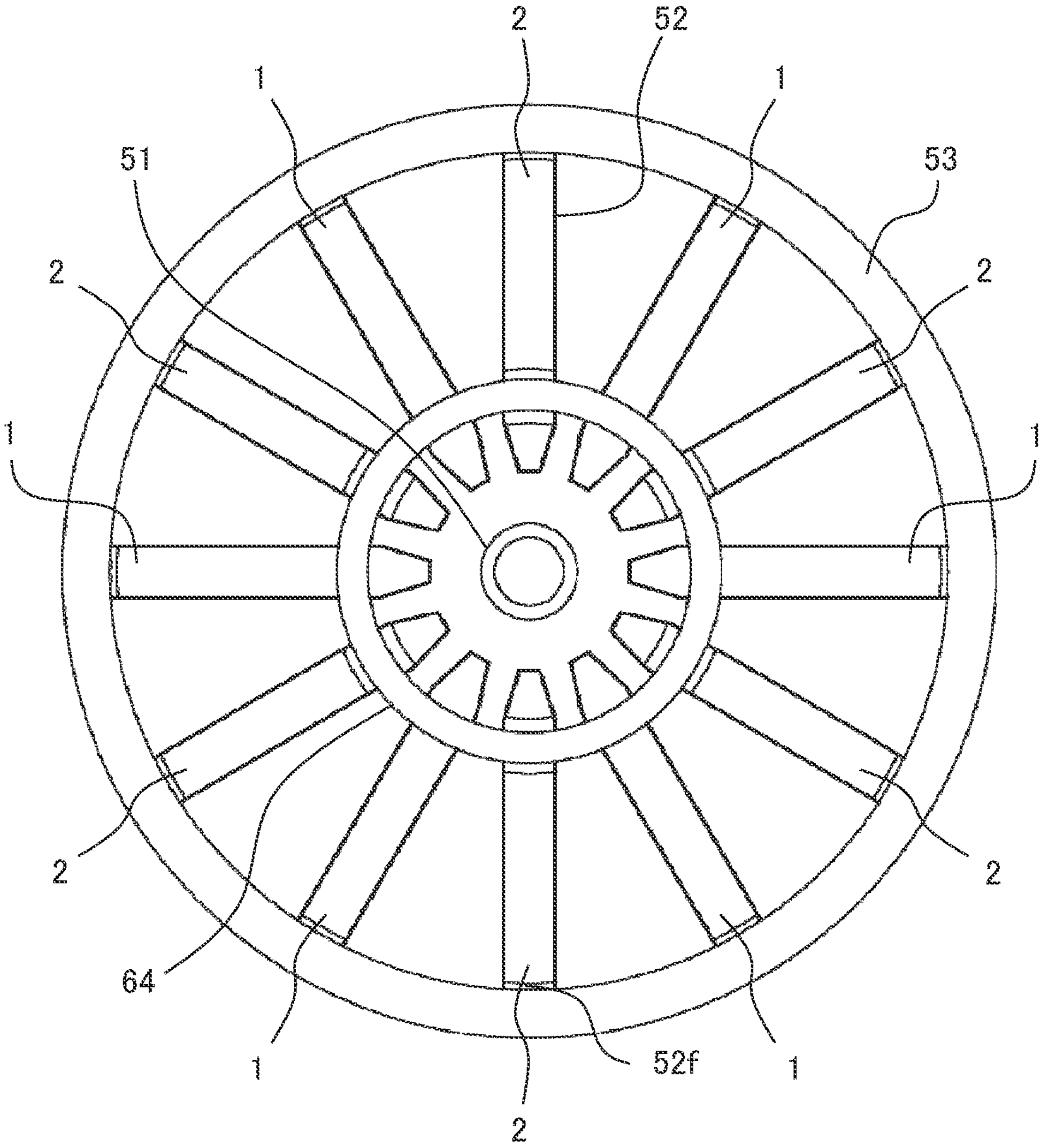
FIG. 4 is a view illustrating arrangement of the plate-shaped vanes on an anode cylindrical body.

FIG. 4 is a view illustrating arrangement of the plate-shaped vanes 52 on the anode cylindrical body 53. The plate-shaped vane 52 is radially disposed around the central axis of the magnetron such that one end of the plate-shaped vane is fixed to the inner wall surface of the anode cylindrical body 53 and the other end extends toward the central axis of the magnetron. The plurality of plate-shaped vanes 52 constitute a first plate-shaped vane group **52*g*1 (1 in the drawing) constituted by a set of plate-shaped vanes arranged in every other line clockwise or counterclockwise with a plate-shaped vane at a predetermined position as a start position and a second plate-shaped vane group 52*g*2 (2 in the drawing) constituted by a set of plate-shaped vanes excluding the first plate-shaped vane group 52*g*1**.

Figure 5:
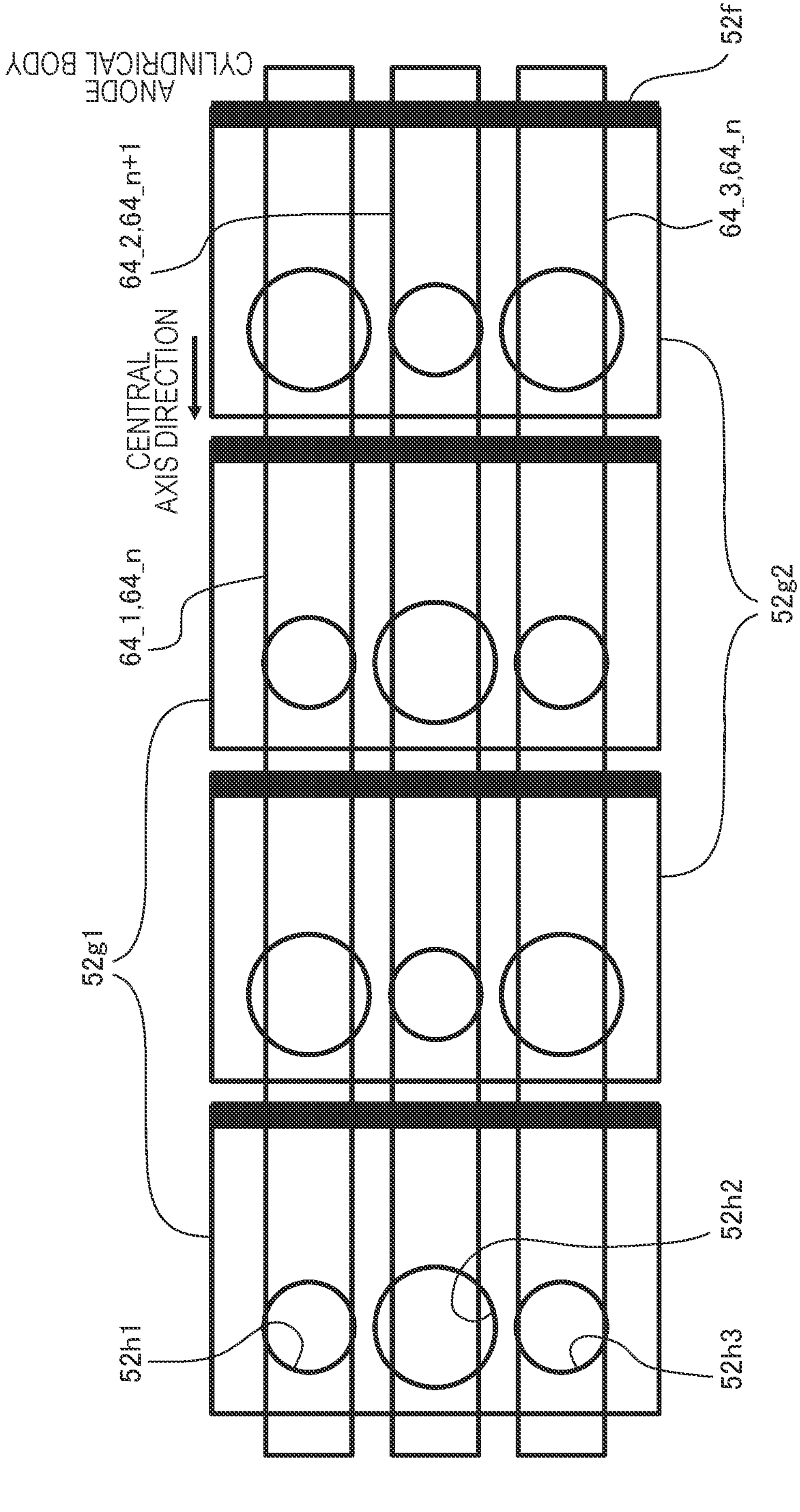
FIG. 5 is a view illustrating a method of arranging a through hole and a pressure equalizing ring.

FIG. 5 is a view illustrating a method of arranging the through hole **52*h* and the pressure equalizing ring 64. Note that in FIG. 5, for convenience of explanation, the plate-shaped vanes 52 illustrated in FIG. 4** are drawn side by side.

In the present embodiment, it is essential to provide at least three or more pressure equalizing rings 64 in order that the plate-shaped vanes 52 are respectively provided to be vertically arranged with the same number (at least three or more) of through holes **52*h* in the vicinity of the end in the central axis direction, and one pressure equalizing ring 64 passes through each of the first through hole 52*h*1, the second through hole 52*h*2, and the third through hole 52*h*3. Note that in this drawing, an example of a minimum configuration in which three through holes 52*h* and three pressure equalizing rings 64** are provided will be described.

In all the plate-shaped vanes 52 belonging to the first plate-shaped vane group **52*g*1, through holes having two types of shapes are provided, and the through holes of the same order have a congruent shape. In addition, also in all the plate-shaped vanes belonging to the second plate-shaped vane group 52g2**, through holes having two types of shapes are provided, and the through holes of the same order have a congruent shape.

Further, in all the plate-shaped vanes 52 belonging to the first plate-shaped vane group, the first and third through holes and the second through hole have different areas. Similarly, also in all the plate-shaped vanes belonging to the second plate-shaped vane group, the first and third through holes and the second through hole have different areas.

Specifically, as illustrated in FIG. 5, as for the sizes of the first through holes 52h1 of the first plate-shaped vane group 52g1 and the second plate-shaped vane group 52g2, when starting with a through hole in which the diameter of the first through hole of the plate-shaped vane belonging to the first plate-shaped vane group 52g1 is small, a through hole in which the diameter of the first through hole of the plate-shaped vane belonging to the next second plate-shaped vane group 52g2 is large is disposed, a through hole in which the diameter of the first through hole of the plate-shaped vane belonging to the next first plate-shaped vane group 52g1 is small is disposed, and this alternation is repeated.

Similarly, as for the sizes of the second through holes of the first plate-shaped vane group 52g1 and the second plate-shaped vane group 52g2, when starting with a through hole in which the diameter of the second through hole of the plate-shaped vane belonging to the first plate-shaped vane group is large, a through hole in which the diameter of the second through hole of the plate-shaped vane belonging to the next second plate-shaped vane group 52g2 is small is disposed, a through hole in which the diameter of the second through hole of the plate-shaped vane belonging to the next first plate-shaped vane group 52g1 is large is disposed, and this alternation is repeated.

The third through hole is similar to the first through hole. Each of the pressure equalizing rings 64 contacts the plate-shaped vane in the through hole having a small area, and does not contact the plate-shaped vane in the through hole having a large area. Note that in the present invention, the shape of the through hole has been described as a circular shape, but it is not particularly necessary to have a circular shape.

Second Problem

In the present embodiment, the second problem, that is, the suppression of the influence of unnecessary radiation on the fundamental wave is solved by using three or more pressure equalizing rings 64. The reason for using three or more pressure equalizing rings 64 will be described with reference to FIG. 6.

Figure 6:
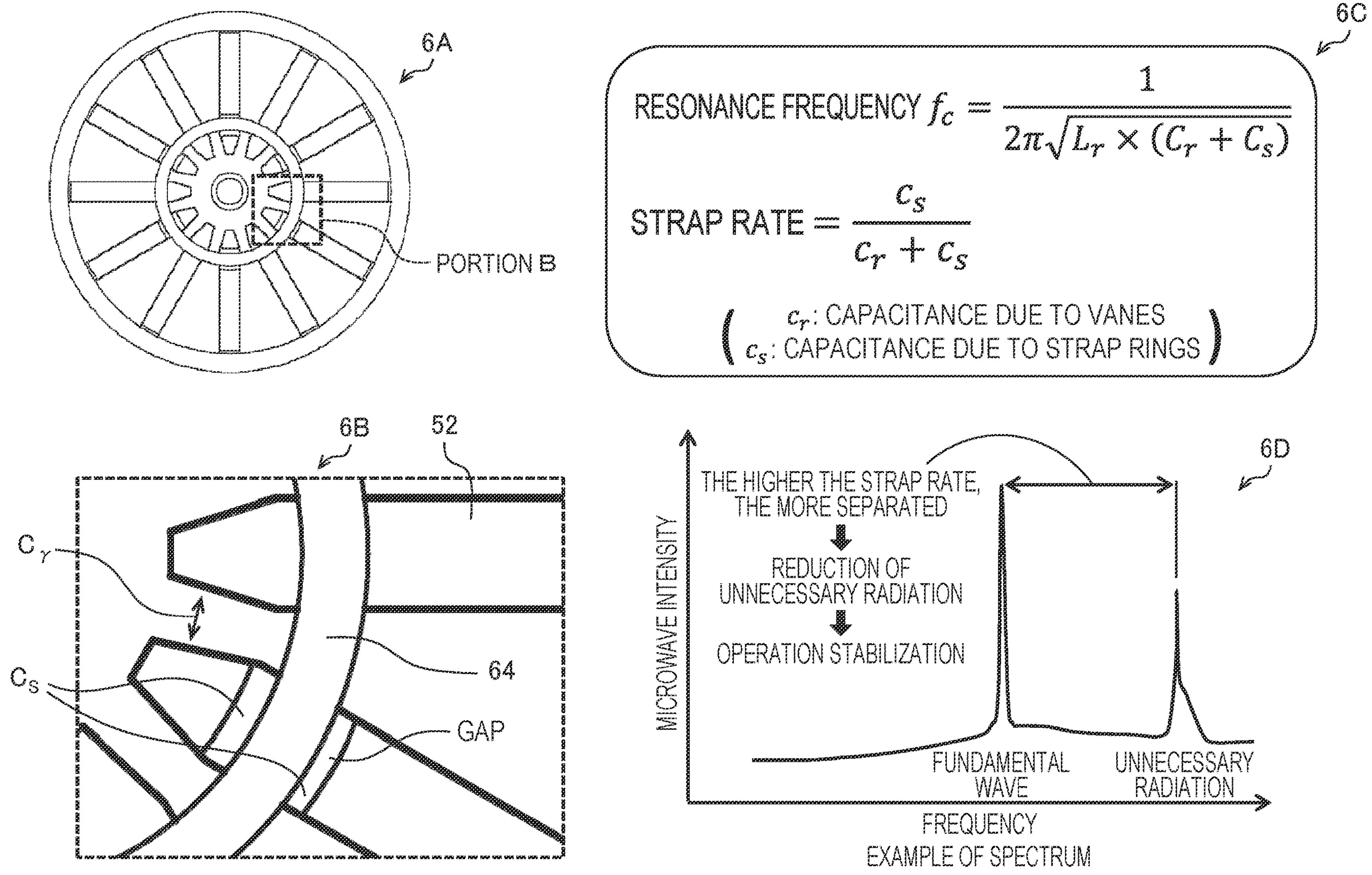
FIG. 6 is a view illustrating a correlation between a strap rate and unnecessary radiation.

FIG. 6 is a view illustrating a correlation between a strap rate and unnecessary radiation. The purpose of the pressure equalizing ring 64 is to equalize the potential of the plate-shaped vane 52 and to suppress the influence of unnecessary radiation that becomes noise. FIG. 6 illustrates a plate-shaped vane arrangement 6A, an enlarged view 6B of a portion B of the plate-shaped vane arrangement 6A, a relational expression 6C of the strap rate, and an example 6D of the spectrum.

The inventors of the present invention have found that in the high-output type magnetron 100, the influence of unnecessary radiation cannot be sufficiently suppressed by the configuration including two pressure equalizing rings 64. Therefore, in the present embodiment, the number of pressure equalizing rings is three or more.

Specifically, the magnetron 100 resonates in a resonance cavity formed by the inner wall surface of the anode cylindrical body 53 and each plate-shaped vane 52, and generates a fundamental wave having a resonance frequency. However, at the same time, unnecessary radiation that adversely affects the fundamental wave is also generated. In a case where the unnecessary radiation is close to the oscillation frequency of the fundamental wave, the influence of the unnecessary radiation on the fundamental wave cannot be suppressed, and abnormal oscillation may be caused, which causes the magnetron to stop oscillation.

Specifically, in the case of a home magnetron or a low-output magnetron having an output of about 2 kW in an industrial magnetron having an output of 2 to 10 kW, even when unnecessary radiation is generated, the likelihood of causing abnormal oscillation is considerably low since the output is not large. However, for example, in the case of a high-output magnetron having a 15 kW class, the influence of the unnecessary radiation cannot be ignored.

In order to suppress unnecessary radiation, it is necessary to reduce the influence by dissociating unnecessary radiation in a frequency band close to the oscillation frequency of the fundamental wave from the oscillation frequency of the fundamental wave as much as possible.

In order to dissociate unnecessary radiation, it is known that an effect can be obtained by increasing the strap rate. According to the calculation formula showing the strap rate illustrated in FIG. 6, the strap rate can be increased by increasing a capacitance Cs formed in a gap between the pressure equalizing ring and the vane not in contact with the pressure equalizing ring illustrated in the enlarged view of FIG. 6B. That is, the influence of unnecessary radiation on the fundamental wave can be eliminated.

In order to suppress the influence of unnecessary radiation on the fundamental wave in the high-output magnetron having an output of 15 kw or more, the inventors have increased Cs by using at least three or more pressure equalizing rings 64. It is advisable that a test operation is performed in the production stage of the magnetron, and the number of the through holes and the number of the pressure equalizing rings are set such that the dissociation between the oscillation frequency of the fundamental wave and the unnecessary radiation is widened to prevent the influence of the unnecessary radiation on the fundamental wave.

Figure 7:
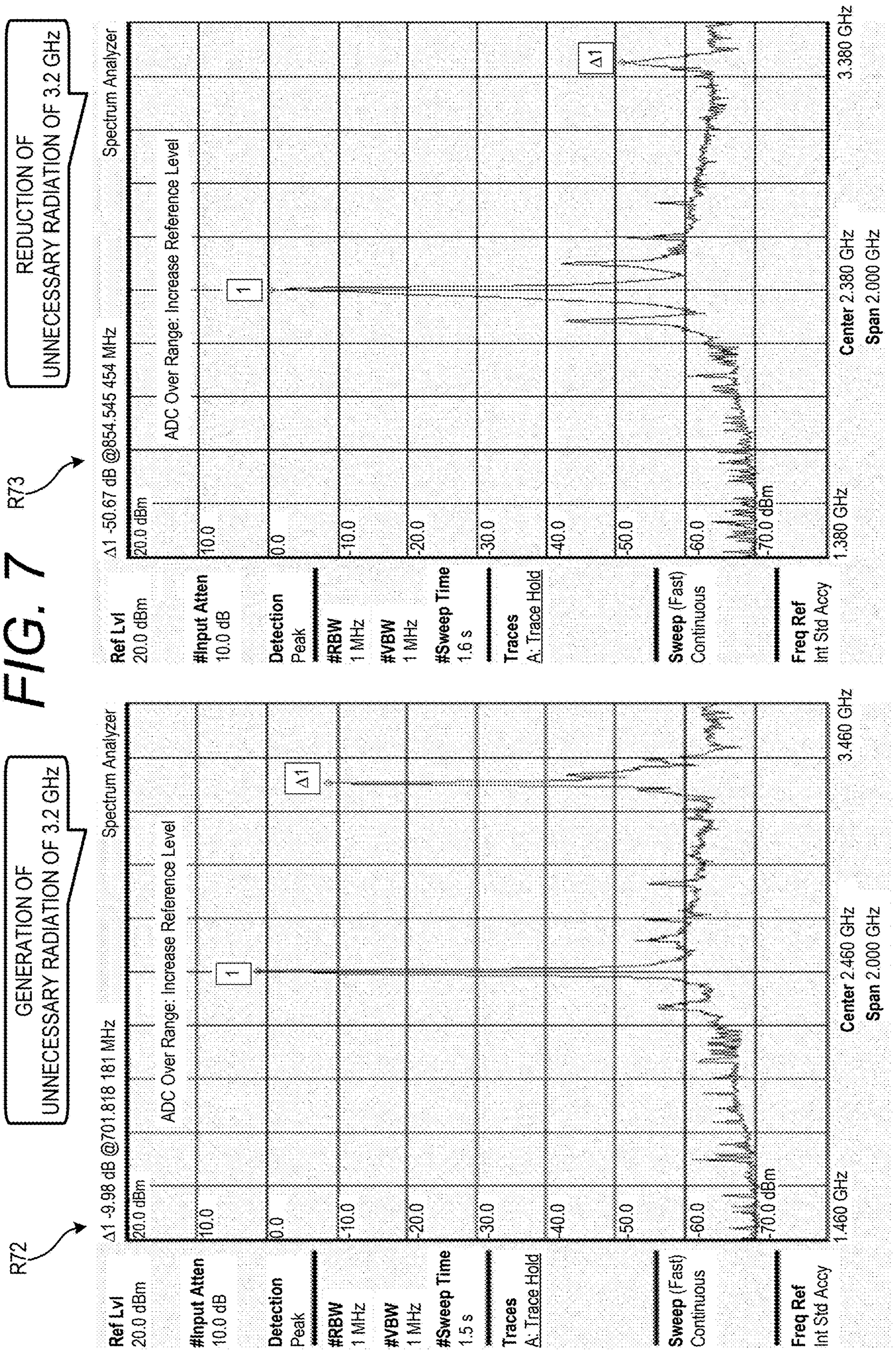
FIG. 7 is a view illustrating an effect of three pressure equalizing rings.

FIG. 7 is a view illustrating an effect of three pressure equalizing rings 64. In order to confirm the effect of the present embodiment, the inventors have verified the generation situation of unnecessary radiation by using the configuration in which two pressure equalizing rings 64 are provided and the configuration in which three pressure equalizing rings 64 are provided. In FIG. 7, the configuration of two pressure equalizing rings 64 have a result and the configuration of three pressure equalizing rings 64 have a result R73.

In the case of the result R72, the fundamental wave is 2.46 GHZ, while the unnecessary radiation is 3.16 GHz, and a frequency difference from the fundamental wave is 0.7 GHZ. On the other hand, in the case of the result R73, the fundamental wave is 2.38 GHZ, while the unnecessary radiation is 3.23 GHZ, and a frequency difference from the fundamental wave is 0.85 GHZ. In the case of the result R73, as compared with the result R72, the unnecessary radiation having a frequency close to the oscillation frequency of the fundamental wave is kept away from the fundamental wave as much as possible, so that it is possible to suppress the influence on the communication equipment or the like using the fundamental frequency.

As illustrated in the diagram of the effect of three pressure equalizing rings in FIG. 7, unnecessary radiation having a large amplitude was generated around 3.2 GHZ in the specification of two pressure equalizing rings, and the magnetron stopped oscillation. When the number of pressure equalizing rings was three, unnecessary radiation around 3.2 GHz was significantly reduced, and the influence on the fundamental wave was suppressed.

Figure 8:
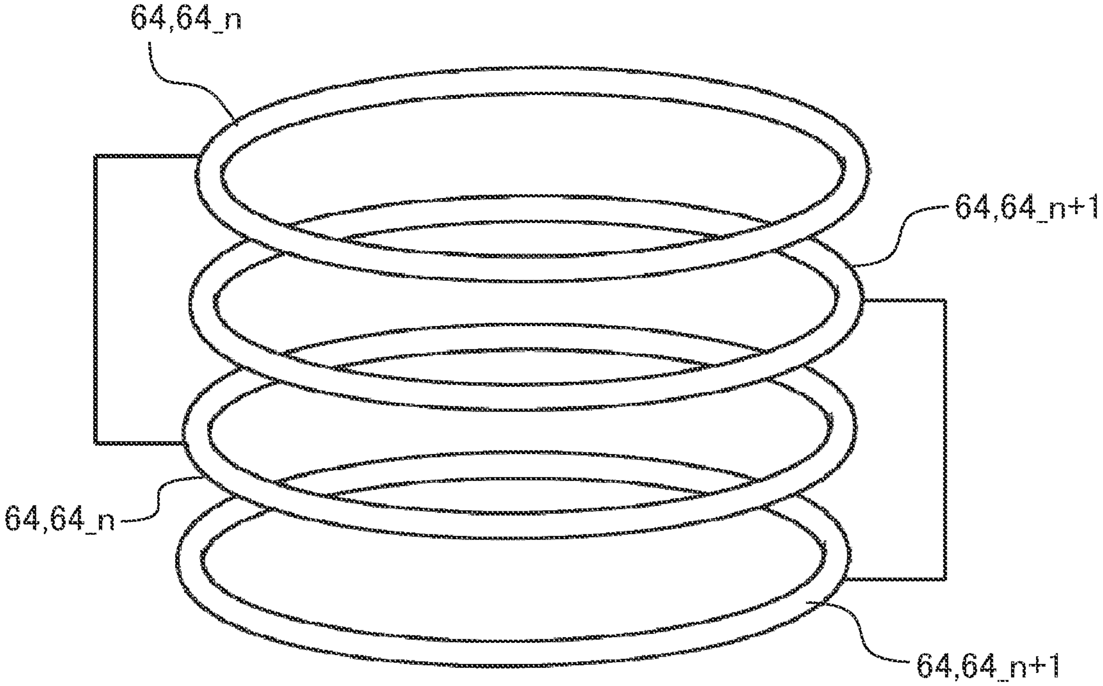
FIG. 8 is a view illustrating connection between pressure equalizing rings.

FIG. 8 is a view illustrating connection between pressure equalizing rings. The connection between the pressure equalizing rings will be described with reference to the view illustrating the connection between the pressure equalizing rings in FIG. 8. By enhancing the uniformity of the potential between the n-th pressure equalizing rings and the uniformity of the potential between the (n+1)-th pressure equalizing rings, the effect of suppressing the occurrence of abnormal oscillation can be further enhanced. As illustrated in FIG. 8, it is preferable that the n-th pressure equalizing rings are connected to each other at a predetermined position of the pressure equalizing rings, and the (n+1)-th pressure equalizing rings are connected to each other at a predetermined position of the pressure equalizing rings.

As described above, the magnetron 100 according to the present embodiment has the following characteristics.

(1) The magnetron 100 is a high-output type industrial magnetron including: an anode cylindrical body 53; a plurality of plate-shaped vanes 52 each of which has one end fixed to each of a plurality of different fixing portions 52*f* on an inner wall surface of the anode cylindrical body 53 and another end extending from the fixing portion 52*f* toward a central axis of the magnetron; and a plurality of pressure equalizing rings 64 arranged inside the anode cylindrical body 53. The plurality of plate-shaped vanes 52 constitutes a first plate-shaped vane group 52*g*1 constituted by a set of the plate-shaped vanes arranged in every other line clockwise or counterclockwise with a plate-shaped vane at a predetermined position as a start position and a second plate-shaped vane group 52*g*2 constituted by a set of the plate-shaped vanes excluding the first plate-shaped vane group 52*g*1.

All the plate-shaped vanes 52 belonging to the first plate-shaped vane group 52*g*1 and all the plate-shaped vanes 52 belonging to the second plate-shaped vane group 52*g*2 have the same number (at least three or more) of through holes 52*h* near tips in a direction of the central axis, and when n is a numerical value indicating an odd number starting with 1, the n-th pressure equalizing ring 64_*n* penetrates to come into contact with the n-th through holes 52*hn* of all the plate-shaped vanes belonging to the first plate-shaped vane group 52*g*1, and the (n+1)-th pressure equalizing ring 64_*n*+1 penetrates to come into contact with the (n+1)-th through holes 52*gn*+1 of all the plate-shaped vanes belonging to the second plate-shaped vane group 52*g*2. According to this, it is possible to prevent damage to the choke coil 81 and to suppress oscillation stop due to occurrence of abnormal oscillation.

(2) In the magnetron 100 of (1), the n-th through holes 52*hn* of all the plate-shaped vanes belonging to the first plate-shaped vane group 52*g*1 have a congruent shape, the (n+1)-th through holes 52*hn*+1 of all the plate-shaped vanes belonging to the second plate-shaped vane group 52*g*2 have a congruent shape, and the n-th through hole 52*hn* and the (n+1)-th through hole 52*hn*+1 have different areas (see FIGS. 4 and 5).

(3) In the magnetron 100 of (1), the n-th pressure equalizing ring 64_*n* does not contact the n-th through holes 52*hn* of all the plate-shaped vanes belonging to the second plate-shaped vane group 52*g*2, and the (n+1)-th pressure equalizing ring 64_*n*+1 does not contact the (n+1)-th through holes 52*hn*+1 of all the plate-shaped vanes belonging to the first plate-shaped vane group 52*g*1 (see FIG. 5).

(4) The magnetron according to (1), the n-th pressure equalizing rings 64_*n* are connected to each other at a predetermined position of the pressure equalizing rings, and the (n+1)-th pressure equalizing rings 64_*n*+1 are connected to each other at a predetermined position of the pressure equalizing rings (see FIG. 8).

(5) In the magnetron 100 of (1), a test operation is performed in a production stage of the magnetron, and the number of the through holes 52*h* and the number of the pressure equalizing rings 64 are set to widen dissociation between a fundamental wave generated by resonance in a resonance cavity and unnecessary radiation (see FIG. 7). As described above, in the specification of two pressure equalizing rings in FIG. 7, unnecessary radiation having a large amplitude was generated around 3.2 GHZ, and the magnetron stopped oscillation. When the number of pressure equalizing rings was three, unnecessary radiation around 3.2 GHz was significantly reduced, and the influence on the fundamental wave was suppressed.

Incidentally, this invention is not limited to the above-described embodiments, and various modifications are included. In addition, the above-described embodiment has been described in detail for easy understanding of the invention and is not necessarily limited to those having all the described configurations. It is possible to add, delete, and replace other configurations for a part of the configuration of each embodiment.

REFERENCE SIGNS LIST

51 cathode filament
52 plate-shaped vane
52*h* through hole
52*g*1 first plate-shaped vane group
52*g*2 second plate-shaped vane group
52*f* fixing portion
53 anode cylindrical body
54, 54*a* permanent magnet
55, 55*a* magnetic pole
56, 56*a* yoke
57 antenna lead
58 antenna block
59 vacuum pipe
61 output-side ceramic
63 active space
64 pressure equalizing ring (strap ring)
66, 67 upper and lower sealing metals
68, 68*a* upper and lower anode plates
69 output portion
70 magnetic circuit unit
71 upper end shield
72 lower end shield
73 cathode lead (center lead)
74 cathode lead (side lead)
75 input-side ceramic
76 terminal plate
77 cooling mechanism
77*a* cooling water passage
78 cathode portion
79 anode portion
80 exhaust pipe
81 choke coil (coil)
82 feedthrough capacitor
83 filter case
84 lid body

85 filter structure
100 magnetron

The invention claimed is:

1. A high-output type industrial magnetron comprising:

an anode cylindrical body;

a plurality of plate-shaped vanes each of which has one end fixed to each of a plurality of different fixing portions on an inner wall surface of the anode cylindrical body and another end extending from the fixing portion toward a central axis of the magnetron; and a predetermined number of pressure equalizing rings arranged inside the anode cylindrical body, wherein the plurality of plate-shaped vanes constitute a first plate-shaped vane group constituted by a set of the plate-shaped vanes arranged in every other line clockwise or counterclockwise with a plate-shaped vane at a predetermined position as a start position and a second plate-shaped vane group constituted by a set of the plate-shaped vanes excluding the first plate-shaped vane group, all the plate-shaped vanes belonging to the first plate-shaped vane group and all the plate-shaped vanes belonging to the second plate-shaped vane group have a same number (at least three or more) of through holes near tips in a direction of the central axis, the number being a number set, by performing a test operation in a production stage of the magnetron, to widen dissociation between a fundamental wave generated by resonance in a resonance cavity and unnecessary radiation, when n is a numerical value indicating an odd number starting with 1, the n-th pressure equalizing ring penetrates to come into contact with the n-th through holes of all the plate-shaped vanes belonging to the first plate-shaped vane group, and the (n+1)-th pressure equalizing ring penetrates to come into contact with the (n+1)-th through holes of all the plate-shaped vanes belonging to the second plate-shaped vane group.

2. The magnetron according to claim 1, wherein the n-th through holes of all the plate-shaped vanes belonging to the first plate-shaped vane group have a congruent shape, the (n+1)-th through holes of all the plate-shaped vanes belonging to the second plate-shaped vane group have a congruent shape, and the n-th through holes and the (n+1)-th through holes have different areas.

3. The magnetron according to claim 1, wherein the n-th pressure equalizing ring does not contact the n-th through holes of all the plate-shaped vanes belonging to the second plate-shaped vane group, and the (n+1)-th pressure equalizing ring does not contact the (n+1)-th through holes of all the plate-shaped vanes belonging to the first plate-shaped vane group.

4. The magnetron according to claim 1, wherein the n-th pressure equalizing rings are connected to each other at a predetermined position of the pressure equalizing rings, and the (n+1)-th pressure equalizing rings are connected to each other at a predetermined position of the pressure equalizing rings.

* * * * *